(12) United States Patent
Rost

(10) Patent No.: US 6,247,877 B1
(45) Date of Patent: Jun. 19, 2001

(54) PIPE SWITCH WITH SPHERICAL PLUG

(75) Inventor: Eugen Rost, Wolfegg-Wassers (DE)

(73) Assignee: Waeschle GmbH, Weingarten (DE)

(*) Notice: Subject to any disclaimer, the term of this patent is extended or adjusted under 35 U.S.C. 154(b) by 0 days.

(21) Appl. No.: 09/133,531

(22) Filed: Aug. 13, 1998

(30) Foreign Application Priority Data

Aug. 21, 1997 (DE) .............................. 197 36 484

(51) Int. Cl.⁷ ........................... B65G 51/24; B65G 53/56
(52) U.S. Cl. ............................... 406/182; 137/876
(58) Field of Search .................. 406/1, 181, 182, 406/183; 137/876, 625.46; B65G 51/24

(56) References Cited

U.S. PATENT DOCUMENTS

| | | | |
|---|---|---|---|
| 4,952,100 | * | 8/1990 | Heep et al. ........................ 406/182 |
| 5,269,638 | * | 12/1993 | Sindermann et al. ............... 406/182 |
| 5,727,595 | * | 3/1998 | Eminger ............................. 137/876 |

FOREIGN PATENT DOCUMENTS 41 14 949 C1   10/1992   (DE) .

* cited by examiner

Primary Examiner—Christopher P. Ellis
Assistant Examiner—Joe Dillon, Jr.
(74) Attorney, Agent, or Firm—Henry M. Feiereisen; Ursula B. Day

(57) ABSTRACT

A pipe switch includes a plug with a spherically arched circumferential surface and having ports for at least one channel. The plug is rotatably supported in a housing about a pivot axis which is formed with an inlet port and two outlet ports. In order to simplify the shape of the housing and reduce the complexity of manufacture, the plug is a spherical segment within a spherical volume bounded by the great circle, with the ports of the channel being bounded at least approximately by substantially coincidental ellipses in the spherical segment of the plug in a projection along an imaginary line connecting the centers of the ports, whereby this imaginary line extends offset with respect to the pivot axis of the plug.

2 Claims, 3 Drawing Sheets

PIPE SWITCH WITH SPHERICAL PLUG

BACKGROUND OF THE INVENTION

The present invention relates generally to a pipe switch for use in a conveying unit for pneumatically conveying bulk material.

German Pat. No. 41 14 949 C1 describes a pipe switch including a housing which has an inlet port and two outlet ports, and accommodates a plug for selectively connecting the inlet port with either one of the two outlet ports. The plug exhibits a circumferential perimeter, which is at least partially spherically arched, and is formed therein with a channel. The plug is rotatably supported in the housing about a pivot axis which extends perpendicular to a great circle of a sphere containing the circumferential perimeter. The housing is provided with an inner surface which complements the circumferential perimeter of the plug, with the inlet port and the outlet ports of the housing being connectable via the channel in a substantially smooth manner. The circumferential surface of the plug is a freely-shaped surface area (a random surface area which is characterized by varying radii of curvature), which constitutes only by approximation and sacrifice of an accurate coincidence of the ports of the channel in the plug with corresponding ports in the housing an area of a spherical segment which is bounded by two parallel planes oriented in symmetry to a center plane extending perpendicular to the pivot axis of the plug. The axis of the channel is offset with respect to the pivot axis of the plug while the channel itself is in symmetric disposition to the center plane. In order to allow assembly and dismantling of the plug, the housing is split in the center plane. Thus, the joint lies on a great circle in the rotational area of the plug and must be made with particular care. Even then, the seals typically used in this area are subject to increased wear during rotation of the plug.

SUMMARY OF THE INVENTION

It is thus an object of the present invention to provide an improved pipe switch, obviating the afore-stated drawbacks.

In particular, it is an object of the present invention to provide an improved pipe switch which is so constructed as to reduce the complexity of manufacturing the housing while avoiding an increased wear on the seals.

These objects, and others which will become apparent hereinafter, are attained in accordance with the present invention by a housing having an inlet port and at least two outlet ports, and a plug formed with a channel having opposite ports for connecting in a substantially smooth manner the inlet port with either one of the outlet ports, with the plug being supported in the housing for rotation about a pivot axis which extends perpendicular to a great circle of a sphere containing the circumferential perimeter, with the housing having an inner perimeter corresponding to the circumferential surface of the plug, wherein the plug is formed by a spherical segment within a spherical volume bounded by the great circle, with the ports of the channel being bounded at least approximately by substantially coincidental ellipses in the spherical segment of the plug in a projection along an imaginary line connecting the centers of the ports, with the imaginary line extending offset with respect to the pivot axis of the plug, wherein the ellipses are defined by major axes describing in a projection in the direction of the imaginary line with the pivot axis of the plug an angle which increases with increasing distance of the imaginary line from the great circle, whereby the offset of the imaginary line with respect to the pivot axis of the plug increases with increasing angle.

It will be understood by persons skilled in the art that the term "spherical segment" will denote a volume that is bounded by a sphere and two parallel planes which intersect the sphere in parallel disposition to a particular great circle of the sphere.

The present invention is based on the surprising recognition that, contrary to conventional teaching, a smooth transition between the inlet and outlet ports of the housing and the respective ports of the channel of the plug can be accomplished even when the channel or at least its ports are situated outside the great circle, and one departs from conventional wisdom that the respective cross section needs to be point-symmetric, i.e. circular, square or rectangular. Based on this recognition, a pipe switch constructed in accordance with the present invention is particularly advantageous because the housing partition plane can now be shifted away from the spherical volume into the plane of a great circle or a plane parallel thereto. As a consequence, the housing may be made by a plug-receiving housing portion and a flange-mounted cover which is substantially flat and closes the housing portion. Thus, the seals will neither be contacted by the plug between the flange-mounted cover and the housing portion nor will seals, which optionally circumscribe the ports of the channel of the plug, pass over a joint or a partition line in the housing portion.

There is no need to provide plug-forming spherical segment and the complementary inner surface of the housing of full shape. Rather, it is sufficient to construct the circumferential perimeter zones of the plug and the corresponding inner surface zones of the housing, arranged co-extensively in the respective rotational positions of the plug, as spherical segments in the area of the respective ports. Thus, the plug can be reduced in size to achieve a substantial weight reduction. Naturally, the formation of dead spaces between plug and inner housing surface should be avoided as bulk material (granular and/or pulverized material) may collect there.

A pipe switch according to the present invention can be designed in various ways and the construction depends on the respective application. This is true for the cross sectional areas of the channel ports and the inlet and outlet ports of the housing as well as to the shape and pattern of the channel and the extent of the offset of the imaginary line, which connects the centers of the port areas, with respect to the pivot axis of the plug. There is no requirement to design a straight channel. It is even conceivable to design the channel with a section arranged outside of the spherical segment of the plug.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
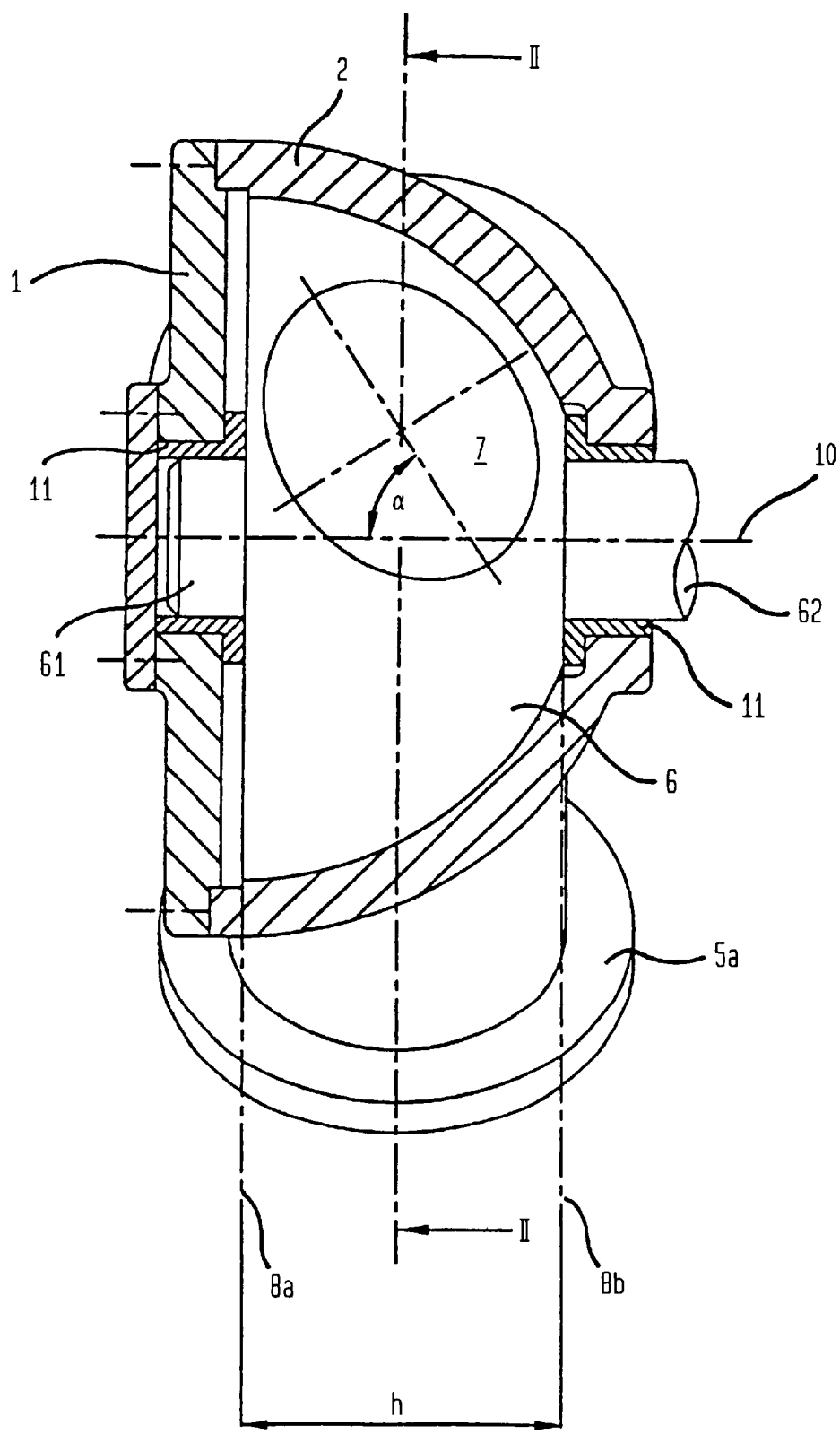
FIG. 1 is a sectional view of one embodiment of a pipe switch according to the present invention, taken along the line I—I in FIG. 2.

Throughout all the Figures, same or corresponding elements are generally indicated by same reference numerals.

Turning now to the drawing, and in particular to FIG. 1, there is shown a sectional view of one embodiment of a pipe switch according to the present invention for conveying bulk material. The pipe switch includes a housing portion 2 which is closed on one end by a flange-mounted cover 1 and has connection flanges 3a, 4a, 5a to form an inlet port 3 and two outlet ports 4, 5. Supported in the housing portion 2 for rotation about a pivot axis 10 is a plug 6 which has opposite journals 61, 62 received in bearings 11, with one of the journals 61, 62 being extended outwardly for connection to a suitable rotary drive (not shown).

The plug 6 is formed with a channel 7, which in the nonlimiting example of FIG. 1 is of straight configuration, for selectively connecting the inlet port 3 with one or the other one of the outlet ports 4, 5. In the position shown in FIG. 2, the channel 7 connects the inlet port 3 with the outlet port 4. In the other position of the plug 6, the channel 7 connects the inlet port 3 with the outlet port 5.

Figure 3:
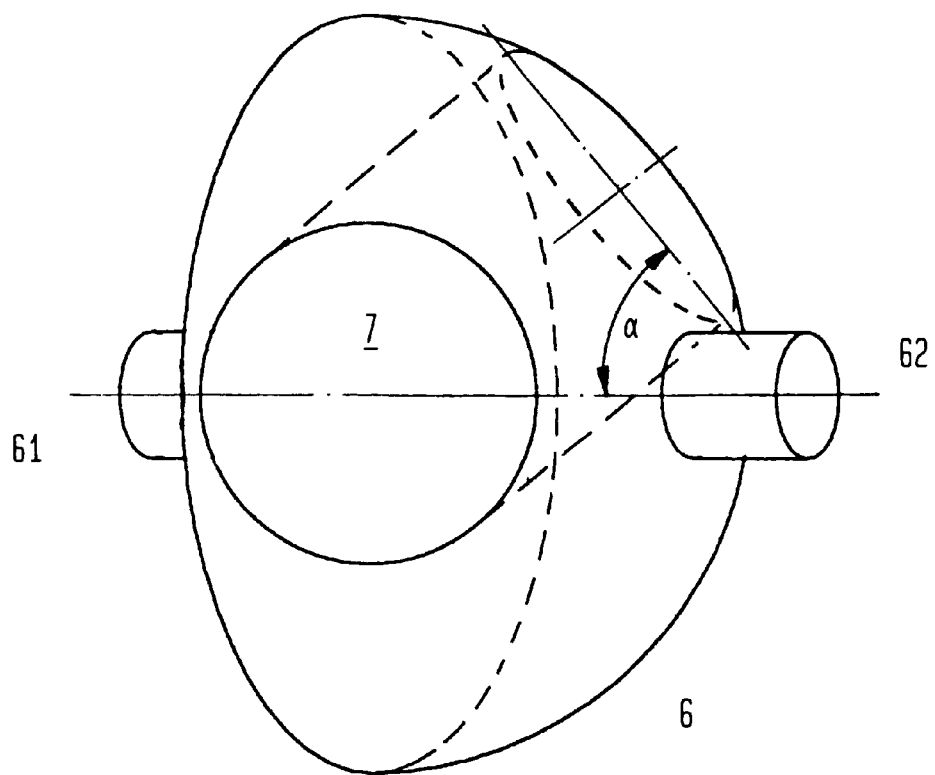
FIG. 3 and FIG. 4 are a perspective view of a plug for use in a pipe switch according to the present invention.
Figure 4:
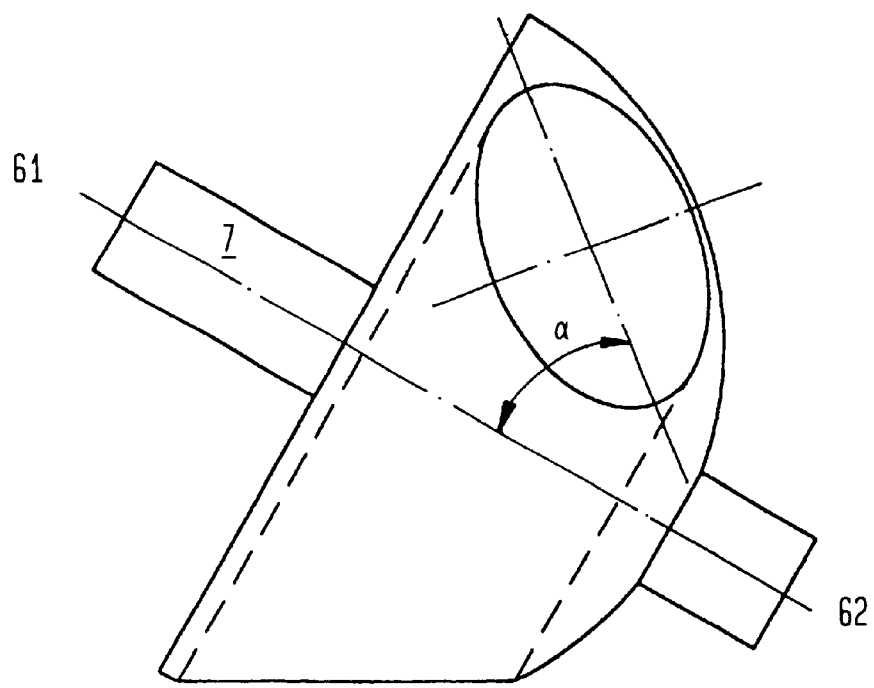

As shown by way of example in FIG. 3, the plug 6 is designed in the shape of a hemisphere, i.e. the plug 6 is formed by a spherical segment of a height h which is measured between the great circle in the plane 8a, and the small circle in the plane 8b, as indicated in FIG. 1. Both ports 7a, 7b of the channel 7 are situated in proximity of the circumferential perimeter of the plug, i.e. in the plane of each spherical cap intersected by the spherical segment and having an axis extending through the center of the full sphere, which center is part of the spherical segment forming the plug. The planes intersecting the spherical caps have a position which is so selected that both ports of the channel 7, as viewed or projected in the direction of a line L connecting the centers $M_1$, $M_2$ of the ports 7a, 7a, assume the shape of ellipses which are upwardly offset with respect to the pivot axis 10 of the plug 6 and are each defined by a major axis which is rotated by an angle $\alpha$ relative to the pivot axis 10 in the projection of FIG. 1.

The inlet port 3 and the outlet ports 4, 5 are bounded by ellipses which are co-extensive to the ellipses of the ports 7a, 7b so as to provide a smooth transition. The elliptic cross section changes gradually in direction of the connection flanges 3a, 4a, 5a (FIG. 3) into a circular cross section so that the pipe switch can be attached to conduits of circular cross section. However, in the non-limiting example of FIGS. 1 to 3, the channel 7 in the plug 6 has an elliptic cross section over its entire length. Persons skilled in the art will understand that the regions of elliptic cross sections are at least equal to the circular cross sections, e.g. at the level of the connection flanges 3a, 4a, 5a.

Figure 2:
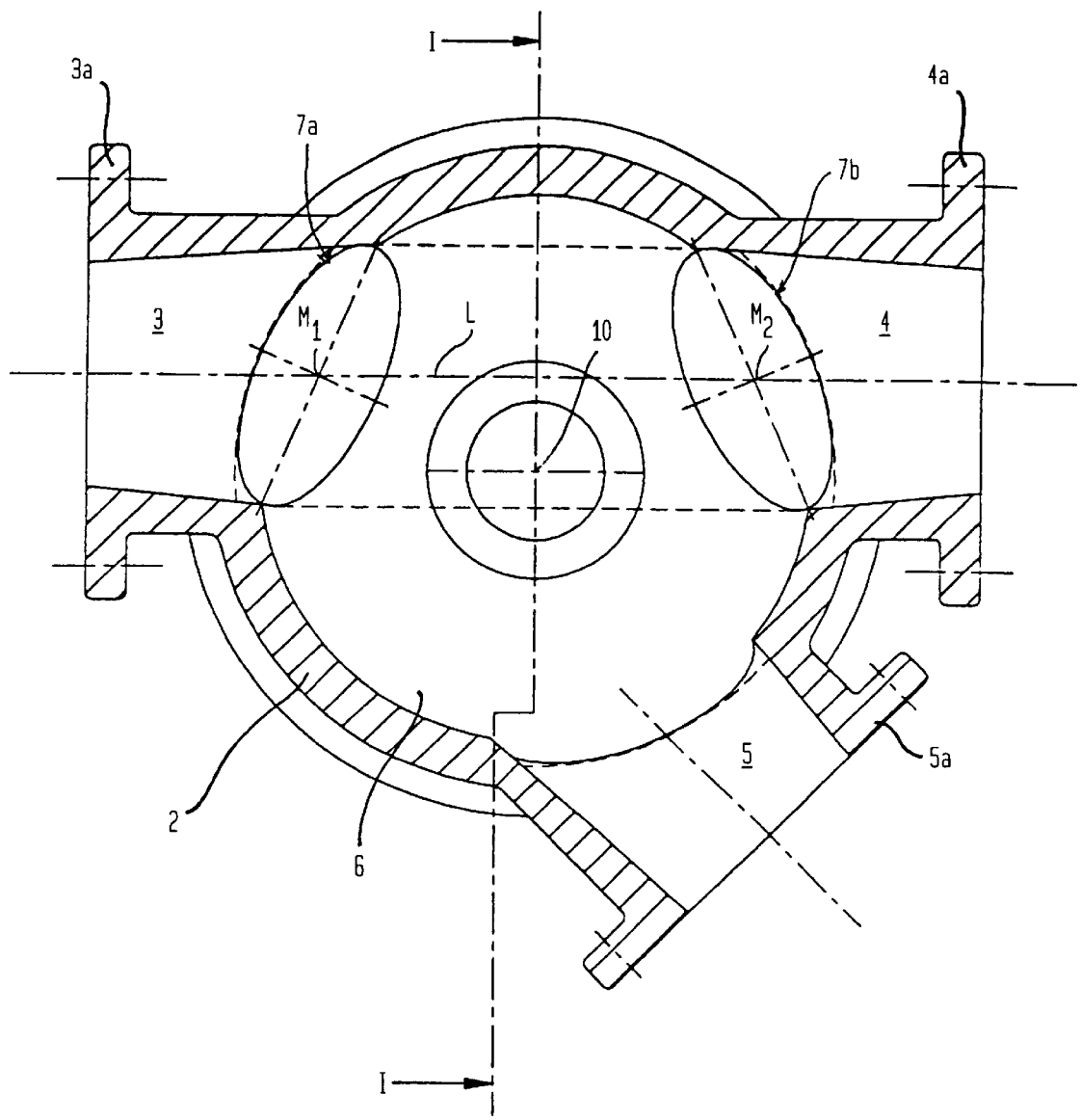
FIG. 2 is a sectional view of the pipe switch taken along the line II—II in FIG. 1.

The offset of the line L which connects the centers $M_1$, $M_2$ of the ports 7a, 7b of the channel 7 and in the non-limiting example of FIGS. 1 to 3 coincides with the center axis of the channel 7, as well as the angle $\alpha$ (see FIG. 1) is governed by the distance of the line L, that connects the centers of the ellipses, from the great circle of the spherical segment, the required transport cross sections, i.e. pipe diameters in vicinity of the connection flanges 3a, 4a, 5a the height h of the spherical segment and the position of the inlet port 3 as well as the outlet ports 4, 5, in particular the angle defined by the axis of the outlet port 5 and the axis of the inlet port 3.

While the invention has been illustrated and described as embodied in a pipe switch with spherical plug, it is not intended to be limited to the details shown since various modifications and structural changes may be made without departing in any way from the spirit of the present invention.

What is claimed as new and desired to be protected by Letters Patent is set forth in the appended claims:

1. A pipe switch for pneumatically conveying bulk material, comprising:

a housing having an inlet port and at least two outlet ports; and a plug having a channel which has opposite ports for connecting the inlet port with either one of the outlet ports, and supported in the housing for rotation about a pivot axis, said plug being formed by a spherical segment defined by a great circle, with the ports of the channel being bounded at least approximately by substantially coincidental ellipses in the spherical segment of the plug in a projection along an imaginary line connecting a center of one of the opposite ports with a center of the other one of the opposite ports, with the imaginary line extending at a distance to the pivot axis of the plug, wherein the ellipses are defined by major axes describing in a projection in the direction of the imaginary line with the pivot axis of the plug an angle which increases with increasing distance of the imaginary line from the great circle, whereby the distance of the imaginary line from the pivot axis of the plug increases with increasing angle.

2. A pipe switch adapted for use in a plant for pneumatically conveying bulk material, said pipe switch comprising:

a housing having an inlet port and at least two outlet ports; and a plug having a circumferential perimeter which is at least partially spherically arched, said plug formed with a channel having opposite ports for connecting in a substantially smooth manner the inlet port with either one of the outlet ports, said plug being supported in the housing for rotation about a pivot axis which extends perpendicular to a great circle of a sphere containing the circumferential perimeter, with the housing having an inner surface corresponding to the circumferential perimeter of the plug, said plug being formed by a spherical segment within a spherical volume bounded by the great circle, with the ports of the channel being bounded at least approximately by substantially coincidental ellipses in the spherical segment of the plug in a projection along an imaginary line connecting a center of one of the opposite ports with a center of the other one of the opposite ports, with the imaginary line extending offset with respect to the pivot axis of the plug, wherein the ellipses are defined by major axes describing in a projection in the direction of the imaginary line with the pivot axis of the plug an angle which increases with increasing distance of the imaginary line from the great circle, whereby also the offset of the imaginary line with respect to the pivot axis of the plug increases with increasing angle.

* * * * *